United States Patent [19]

Andonov et al.

[11] Patent Number: 5,676,170
[45] Date of Patent: Oct. 14, 1997

[54] GASTIGHT ISOLATION VALVE FOR SOLID MATERIALS

[75] Inventors: Radomir Andonov, Mamer; Emile Lonardi, Bascharage; Gilbert Bernard, Helmdange; Giovanni Cimenti, Fentange, all of Luxembourg

[73] Assignee: Paul Wurth S.A., Luxembourg

[21] Appl. No.: 171,900

[22] Filed: Dec. 22, 1993

[30] Foreign Application Priority Data

Dec. 22, 1992 [LU] Luxembourg .................. LU 88 025

[51] Int. Cl.⁶ .................. B08B 3/02; F16K 1/18
[52] U.S. Cl. .................. 137/240; 222/148; 134/166 C; 251/298
[58] Field of Search .................. 137/240; 251/298, 251/300; 134/166 C; 222/148

[56] References Cited

U.S. PATENT DOCUMENTS

| | | | |
|---|---|---|---|
| 3,075,539 | 1/1963 | Yoder | 137/240 |
| 3,603,339 | 9/1971 | Swain | 137/240 |
| 3,679,193 | 7/1972 | Nieboer | 137/240 |
| 4,033,549 | 7/1977 | Stamer | 251/298 |
| 4,505,292 | 3/1985 | Osterode | 137/240 |
| 4,674,922 | 6/1987 | Federhen et al. | 137/240 |
| 4,838,301 | 6/1989 | Lamort | 137/240 |

Primary Examiner—George L. Walton
Attorney, Agent, or Firm—Fishman, Dionne & Cantor

[57] ABSTRACT

A gastight isolation valve for solid materials is presented. The body of the valve has a lower edge which, defines, in the leaktight closed position, an air seal. The air seal is surrounded by a projecting element of the closure member which comprises, on the outer side, an outer peripheral flank having a first gradient. A peripheral sealing surface extends the outer peripheral flank. The sealing surface interacts with a sealing seat of the valve body to provide gastightness.

23 Claims, 2 Drawing Sheets

GASTIGHT ISOLATION VALVE FOR SOLID MATERIALS

BACKGROUND OF THE INVENTION

This invention relates generally to isolation valves for solid materials. More particularly, this invention relates to a gastight isolation valve for solid materials that allows free flow, in the open position, of solid materials from a fist enclosure to a second enclosure and, in the closed position, retain the remaining solid material in the first enclosure and make the closed opening gastight.

Gastight valves are known which are, for example, used in charging locks for shaft furnaces, for baths for reducing ores, baths for the gasification of coal, etc. These leaktight valves generally comprise a valve body equipped with a lower edge defining an outlet opening, a closure member movable with respect to the valve body equipped with a peripheral sealing surface and a mechanism for operating the closure member. The peripheral sealing surface and the sealing seat surrounding the valve body interact with each other to define at least one sealing position of the closure member on the sealing seat. The mechanism for operating the closure member is arranged so as to pivot the closure member from the sealed position in the direction of the flow of material leaving the outlet opening into a lateral position in which the peripheral sealing surface is completely located away from the flow of material.

Used as a member for retaining solid materials, such a valve rapidly loses its gastight function. Indeed, the peripheral sealing surface of the closure member is rapidly destroyed by abrasion by the solid materials flowing along the sealing member during its opening movement. In addition, the penetration of solid materials between the sealing surfaces during the closure movement prevents not only the leaktight closure of the valve, but also leads to a deterioration of the sealing surfaces and seals.

When such a gastight valve is incorporated into a charging lock, it must, as a consequence, compulsorily be preceded upstream by a separate isolating member, generally a bell, which acts as a retaining member for the solid materials. This isolation member has the function of releasing the solid materials only when the leaktight valve has completely pivoted into the lateral position in which the peripheral sealing surface of the closure member is completely located away from the zone in which the flow of materials is to be set up. Elimination of the separate isolating member is desirable and would effect economic savings.

SUMMARY OF THE INVENTION

The above-discussed and other problems and deficiencies of the prior art are overcome or alleviated by the gastight isolation valve for solid materials of the present invention. In accordance with the present invention, a gastight isolation valve for solid materials comprises a central shut-off surface located directly below the outlet surface (which is located directly below the outlet opening) and a peripheral shut-off surface which defines, together with the lower edge of the valve body, an air seal. Generally, this invention converts an gastight valve of the prior art type mentioned in the background of the invention. This invention, thus, converts such a gastight valve so that the valve can be used in changing locks without the member previously required for retaining the solid material directly upstream of the gastight isolation valve. The peripheral shut-off zone is itself surrounded by a projecting element surrounding the lower edge of the valve body in the sealing position. The projecting element comprises an outer peripheral flank defining a gradient oriented towards the outside in the direction of the flow of material. The peripheral sealing surface of the closure member extends the outer peripheral flank in the direction of the flow of the material with a gradient which is steeper than that of the outer peripheral flank.

When the closure member is in the sealing position, the central part of the closure member is located directly facing the outlet opening for the flow of materials and defines an air seal with the lower edge of the valve body. This air seal is dimensioned particularly as a function of the particle size of the solid material. It must not be dimensioned too small so that larger solid particles do not prevent the closure member from seating on its sealing seat. If this dimension is too large, a too great quantity of solid material will be allowed to flow between the peripheral shut off surface and the lower edge of the body of the valve. It will be noted that this flow of solid material will stop automatically when the solid material, most often granular products with a somewhat fine particle size, have formed, around the seal, a slope whose gradient corresponds to the natural slope angle of the product in question.

In the sealing position, the projecting element limits the radial extent of this slope over the upper surface of the closure member. It thus avoids the penetration of solid materials into the sealing zone proper. In this manner there is always a clear separation between the zone of the closure member fulfilling the shut off function and the zone fulfilling the sealing function. The sealing zone is, in the closed position of the closure member, completely isolated with respect to the solid material retained by the shut off zone of the closure member.

For an opening of the valve through an angle of just a few degrees, no flow of solid materials is observed. These materials are, in effect, halted by the projecting element facing the air seal defined between the peripheral shut off surface and the lower edge of the body of the valve. It is therefore perfectly possible to open the proposed valve by just a small amount so as, for example, to balance the pressures in the enclosures on either side of the valve, and then to close it afterwards. It will be appreciated that during this closure of the valve, there is no risk of the sealing surface of the seat or the peripheral sealing surface of the closure member being damaged by solid particles caught between the two surfaces.

When the closure member is further inclined, the solid materials start to flow over the upper edge of the projecting element at the lowest point on the projecting element. As the speed of the particles is, at this stage in the opening of the valve, still low, the solid particles follow the outer peripheral flank of the projecting element. The latter forms a type of "springboard" upstream of the peripheral sealing surface. The gradient of this outer peripheral flank gives the solid particles a horizontal speed component, which is sufficient to make the majority of the solid particles jump over the peripheral sealing surface of the closure member which has a steeper gradient. The greater the speed of the solid particles, the less they are likely to encounter the sealing surface. As a consequence, only the particles with low energy, therefore low abrasive power, are likely to encounter the sealing surface. The gradient of this outer peripheral flank gives the solid particles a horizontal speed component, which is sufficient to make the majority of the solid particles jump over the peripheral sealing surface of the closure member which has a steeper gradient. The greater the speed of the solid particles, the less they are likely to encounter the sealing surface. As a consequence, only the particles with low energy, therefore, low abrasive power, are likely to encounter the sealing surface. The sealing surface of the closure member is therefore completely protected against any excessive abrasion from the solid particles flowing from the valve when it is initially opened. If the inclination of the closure member increases, the speed of the particles flowing over the upper edge of the projecting element increases as well. More and more solid particles are thrown directly into the space without encountering the peripheral flank of the projecting element or the peripheral sealing surface which are more and more sheltered vertically below the projecting element.

It will therefore be appreciated that for the valve of the present invention, the peripheral sealing surface of the closure member is completely protected against abrasion by the flow of solid material for any inclination of the closure member. In addition, the shut off surface of the closure member is itself also ideally protected against abrasion by a layer of solid materials retained by the inner flank of the projecting element.

The gastight valve of the present invention may therefore be used perfectly well as a member for retaining solid materials without fear of rapid wear of the sealing surfaces and/or of the shut off surfaces. In this manner, the conventional retaining member provided in the charging locks upstream of the gastight valve may be omitted. This naturally reduces the manufacturing costs of such locks and at the same time reduces the number of moving parts which require maintenance.

In a preferred embodiment, the lower edge of the valve body, which, together with the peripheral shut off surface of the closure element, defines the air seal, is chamfered. This embodiment facilitates closure of the closure member in the event of solid material being present on the peripheral shut off surface of the closure member.

The outlet opening of the valve body may naturally have any cross-section. However, most often it will have a circular cross-section. The closure member will then preferably have the form of a soup dish with a raised rim.

The leaktight seat advantageously comprises an O-ring, for example an elastomeric O-ring. This seal is preferably incorporated into a conical sealing surface. The peripheral sealing surface of the closure element is preferably a spherical surface. In this fashion, sealing between the two surfaces is guaranteed even if the closure member is slightly inclined with respect to its normal position on its leaktight seat. This inclination may, for example, be due to the fact that a bit of solid material has remained caught between the lower edge of the valve and the peripheral shut off surface of the closure member.

The closure member is preferably mounted on one end of a pivot arm. The other end of this arm is articulated about an axis located away from the zone occupied by the flow of materials. The closure member is mounted on this pivot arm preferably using an articulation defining two perpendicular pivot axes. In this fashion, the closure member may position itself obliquely on its sealing seat if bits of solid materials have remained caught between the edge of the body of the valve and the peripheral shut off surface of the closure member. Sealing is still guaranteed in this case by interaction of the spherical surface of the closure member with the conical surface of the sealing seat at the O-ring.

Upstream of the leaktight seat there is advantageously formed a passage for blowing in a pressurized gas, for example, compressed air. The blowing passage makes it possible to clean the sealing surfaces before closing the closure member. This prevents finer particles of materials, which may be stuck to the sealing surfaces from damaging the sealing surfaces when the valve is closed.

It will be appreciated that the outer peripheral flank of the projecting element may be advantageously equipped with an anti-abrasive coating, while the peripheral sealing surface may also be advantageously equipped with an anticorrosive coating. Each of these two surfaces may thus receive the type of protection which is best suited to their function.

The above-discussed and other features and advantages of the present invention will be appreciated and understood by those of ordinary skill in the art from the following detailed discussion and drawings.

BRIEF DESCRIPTION OF THE DRAWINGS

Referring now to the drawings, wherein like elements are numbered alike in the several FIGURES.

DESCRIPTION OF THE PREFERRED EMBODIMENT

Figure 1:
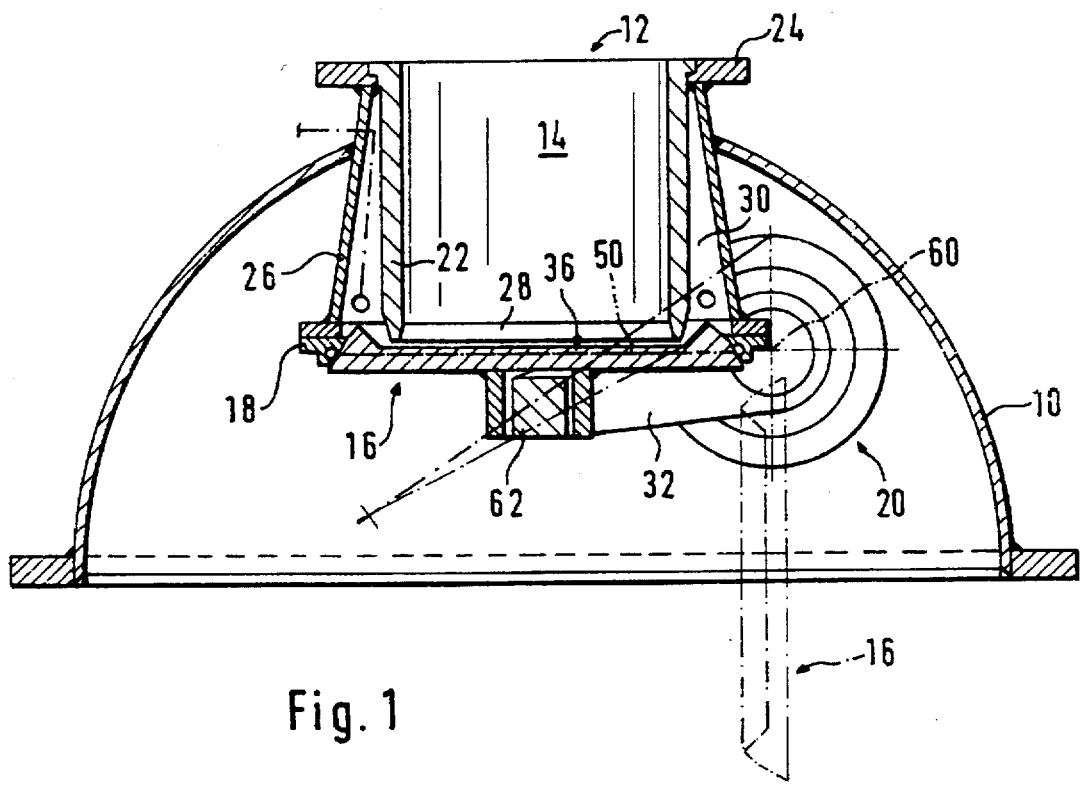
FIG. 1 is a cross-section of the valve mounted in an upper dome of an enclosure, for example, a charging lock.

Referring first to FIG. 1, the gastight isolation valve for solid materials of the present invention is shown generally at 12. Upper dome 10 of an enclosure is, for example, the upper dome of a charging lock of a bath for reducing ores or a bath for the gasification of coal.

Device 12 comprises a valve body 14, a closure member 16, a sealing seat 18 and a member 20 for operating the closure member 16. The valve body 14 comprises an inner cylindrical sleeve 22 and an upper flange 24. To this upper flange 24 is connected, for example, a charging hopper (which is not shown or represented). Through the use of the flange 24, the valve body is supported, in a leaktight fashion, by a second, outer frustoconical sleeve 26. This sleeve 26 which widens from the top downwards is, for example, welded in a leaktight fashion in the dome 10. The outer sleeve 26 and the inner sleeve 22 between them define an annular space 30 which widens from the top downwards. At the lower edge 28 of the inner cylindrical sleeve 22, this outer frustoconical sleeve 26 supports the sealing seat 18 in a leaktight fashion. It will be noted that the sealing seat 18 has an inside diameter which is greater than the outside diameter of the lower edge 28 of the sleeve 22, so that between the two elements there remains an open annular section opening out into the annular space 30.

In FIG. 1, the closure member 16 is shown in the closed position on its leaktight seat 18. This closure member 16 itself has the form of a hollow dish and it is supported by one end of a pivot arm 32 below the leaktight seat 18.

It will be noted that in the closed position, the lower edge 28 of the inner sleeve 22, which defines the outlet opening for the solid materials, is located set back with respect to the upper surface, or shut off surface 36 of the closure member 16. It follows that the lower edge 28 defines, together with an annular peripheral shut off surface 37 of the closure member 16, an air seal of height "h" (see FIG. 2).

The annular shut off surface 37 is itself surrounded by a projecting element 38 which, when the closure member is in the said closure position, penetrates into the annular space 30 so as to surround the lower edge 28 of the sleeve 22. The projecting element 38 thus constitutes a barrier around the air seal halting the solid materials which flow laterally through the projecting element 38. The projecting element 38 comprises an inner flank 40, defining a gradient orientated towards the inside, that is to say towards the shut off surfaces 36, 37 and an outer peripheral flank 42, defining a gradient orientated towards the outside, that is to say towards the periphery of the closure member 16.

Figure 2:
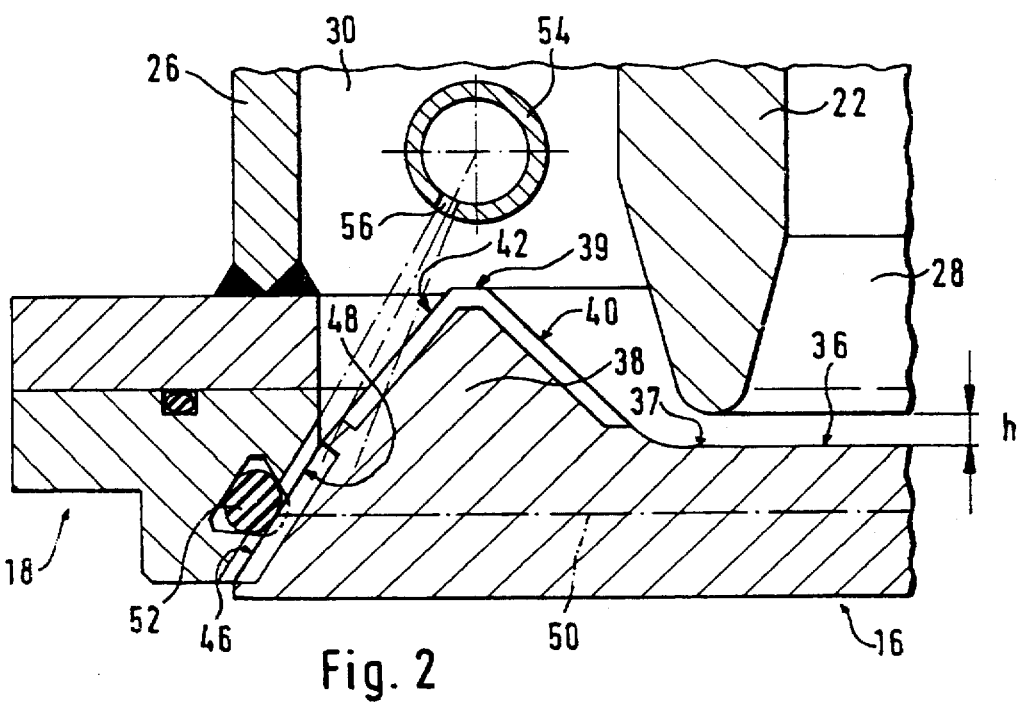
FIG. 2 is an enlarged detail of FIG. 1.

It will be noted that the projecting element 38 is preferably coated with a more abrasion resistant material, identified by the reference 44. FIG. 2 shows that the projecting element has, for example, a triangular cross-section with a slightly flattened apex 39.

The arrow 46 in FIG. 2 identifies an annular peripheral sealing surface formed around the closure member 16 downstream of the outer peripheral flank 42 of the projecting element 38. This sealing surface 46 itself also defines a gradient orientated towards the outside, but this gradient is slightly steeper than the gradient of the flank 42.

For preference, the surface 46 is a spherical ring. The leaktight seat 18 then has a conical annular sealing surface 48, so as to define, together with the spherical ring 46, a sealing circumference identified by the reference 50. At this sealing circumference 50, the sealing surface 48 is equipped with a circumferential cut in which an O-ring 52, made, for example, from an elastomeric material, is fitted.

It will be noted that the surface 46 preferably consists of a corrosion-resistant material.

Upstream of the leaktight seat 18 there is incorporated an annular blowing passage 54 in the annular space 30. This blowing passage is connected to a network for distributing compressed air, or another pressurized gas, and is equipped with blowing orifices 56 oriented in the direction of the sealing surface 48. It will be noted that the pressurized gas makes it possible to clean the two sealing surfaces when the closure member is slightly open.

The mechanism 20 for operating the closure member 16 will be described with the aid of FIG. 1. The arm 32 is articulated at its second end about an axis 60. This axis 60 is preferably contained in the plane defined by the sealing circumference 50 and tangential to a concentric circumference, of slightly greater diameter than the circumference 50. This arm is equipped with a suitable driving member, for example with a hydraulic piston, which makes it possible to pivot the closure member 16 through an angle of 90° from the closed position, in which it is represented in solid line, into the open position, in which it is represented in broken line. The closure member 16 is mounted on the other end of the arm 32 preferably with the aid of an articulation 62, defining two mutually perpendicular pivot axes. The point of intersection of these pivot axes corresponds to the center of the imaginary sphere which defines the spherical ring 46. In this fashion, the closure member 16 may adopt various positions on its leaktight seat 18. For all these positions, sealing is however produced at the seal 52. The benefit of this mounting is that a bit of material caught between the lower edge 28 of the cylindrical sleeve 22 and the shut off surface 37 of the closure member 16 cannot prevent sealing of the valve.

It will also be noted that the lower edge 28 of the inner sleeve 22 is preferably chamfered. In this fashion, it can split bits of materials which may have become caught when the valve was closed and it is better able to penetrate into the solid material which may cover the shut off surface 36, 37.

The opening of the valve and the outflow of the solid materials will be described with the aid of FIGS. 3A to 3E, which represent the valve with greater and greater angles of inclination of the closure member 16. As this is a section through the axis of the valve along a plane perpendicular to the pivot axis 60, the position of outflow of materials represented corresponds to the position at the lowest point of the closure member 16. It is obvious that, for another peripheral point of the closure member 16, the position, for the same angle of inclination of the closure member 16 is slightly different from the position represented.

Figure 3A:
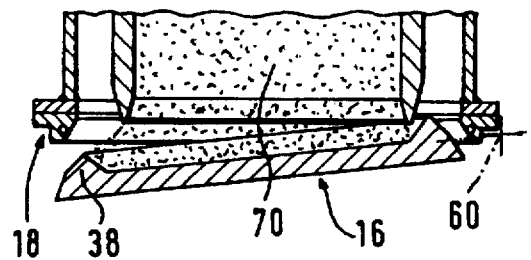
FIGS. 3A to 3E show the valve in various opening positions.

In FIG. 3A, the valve is only slightly open, that is to say that the closure member 16 has been pivoted by just a few degrees about its axis 60 to leave its sealing seat 18. It is noticed that up to this inclination position of the closure member 16, the solid material or granulate 70 is halted by the closure member 16, more precisely by the projecting element 38 of the closure member 16.

Figure 3B:
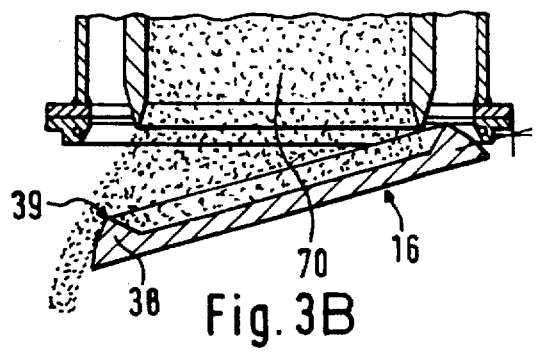

In FIG. 3B, the closure member 16 is already further inclined. The granulate 70 is poured out over the apex 39 of the projecting element 38. The solid particles which still have a relatively low speed follow the outer peripheral flank 42 of the element 38. Along this flank 42 the particles are accelerated by gravity so that they receive a speed which is sufficient to make at least the great majority of the particles jump over the peripheral sealing surface 46 which is located downstream of the flank 42 and which has a steeper gradient than the flank 42. A few particles, which have a lower speed, may possibly encounter the sealing surface 46. It will, however, be noted that the kinetic energy of these particles is low and that their abrasive power is consequently reduced.

Figure 3C:
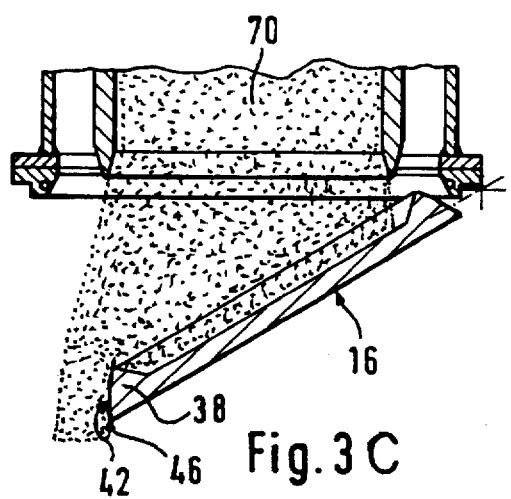

In FIG. 3C, the closure member 16 is still further inclined. In this position, the gradient of the flank 42 represented in section is already almost vertical, and the particles are thrown directly over the apex 39. A great part of the sealing surface 46 is now vertically below the projecting element and in this position is completely sheltered from the granulate 70.

Figure 3D:
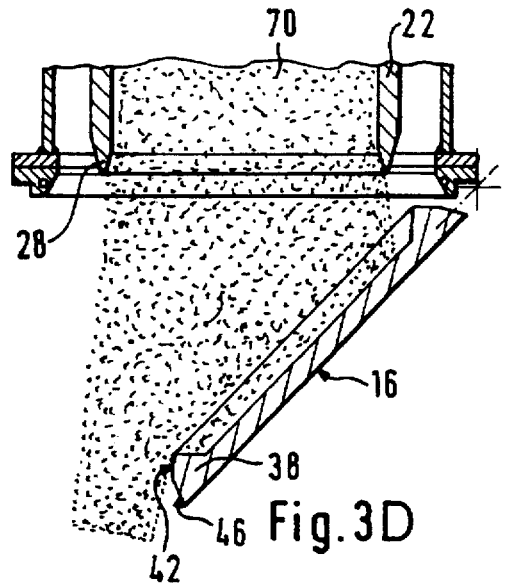

In FIG. 3D, the closure member 16 has already freed a part of the outlet cross-section defined by the lower edge 28 of the sleeve 22. It will be noticed that the shut off surface 36, 37 of the closure member 16 is protected by a layer of solid materials retained behind the inner flank 40 of the projecting element 38.

Figure 3E:
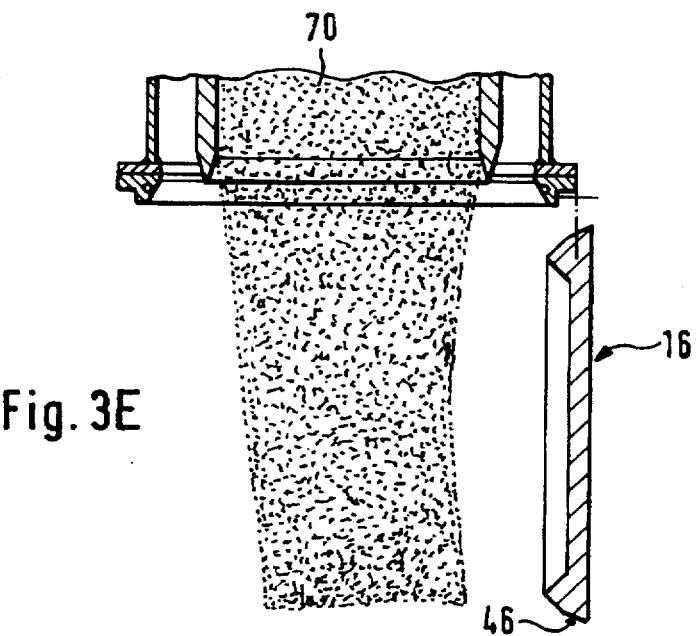

Finally, in FIG. 3E, the closure member 16 is entirely open. It occupies a position which is lateral with respect to the vertical flow of materials 70 and in this position is located completely away from this flow. It will be noted that rapid opening of the valve will favorably influence the constructive measures taken to protect the peripheral sealing surface 46 against abrasion.

The valve is preferably mounted in the lock so that the shut off surface 36 of the closure member 16 is horizontal when the valve is closed. Suitable precautions may further be taken to protect the sealing edge, for example, locally raising the projecting element 38, or extending the lower edge 28 beyond the leaktight seat 18 in the direction of the flow of materials. It is, however, also possible to design a valve of the sort proposed, in which the closure member is inclined with respect to a horizontal plane.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A gastight isolation valve for controlling the flow of solid materials, said valve comprising:

a valve body having a sleeve with a lower edge defining an outlet opening;

a closure member moveable with respect to said sleeve and equipped with a peripheral sealing surface;

a sealing seat surrounding and spaced from said sleeve and interacting with said peripheral sealing surface so as to define at least one sealing position of said closure member on said sealing seat;

said closure member including:

a central shut off surface which in said sealing position is directly located below said outlet opening, and a peripheral shut off surface surrounding said central shut off surface, said peripheral shut off surface and said lower edge of said valve body cooperating in said one sealing position to define an air seal; and a projecting element surrounding said peripheral shut off surface and said lower edge of said valve body and extending above said lower edge of said sleeve in said one sealing position, said projecting element comprising, on an outer side, an outer peripheral flank having a first gradient oriented towards the outside in the direction of the flow of materials, said peripheral sealing surface being an extension of said outer peripheral flank and having a second gradient which is steeper than said first gradient of said outer peripheral flank;

said projecting element, and said first and second gradients cooperating to protect said peripheral sealing surface from abrasion when said closure member is opened to permit flow of solid material; and operating means for operating said closure member arranged so as to pivot said closure member from said sealing position in the direction of flow of materials leaving said outlet opening into a lateral position in which said peripheral sealing surface is located away from the flow of materials.

2. The device of claim 1 wherein:
the lower edge of said valve body is chamfered.

3. The device of claim 1 wherein:
the outlet opening of said valve body has a circular cross-section and said closure member has the form of a dish with a raised rim.

4. The device of claim 3 wherein:
said sealing seat includes an O-ring.

5. The device of claim 4 wherein:
said O-ring is in a conical sealing surface of said sealing seat, and said peripheral sealing surface of said closure member has a spherical surface.

6. The device of claim 5 wherein:
said closure member is equipped with an articulation defining two perpendicular pivot axes.

7. The device of claim 1 wherein:
said closure member is mounted on one end of a pivot arm, and an opposed end of pivot arm is articulated about an axis located away from the flow of materials.

8. The device of claim 1 including:
passage means for blowing in a pressurized gas upstream of said one sealing position to clean said peripheral sealing surface and said sealing seat prior to closure of said closure member.

9. The device of claim 1 wherein:
said outer peripheral flank of said projecting element includes an anti-abrasive coating.

10. The device of claim 1 wherein:
said peripheral sealing surface of said closure member includes an anti-corrosive coating.

11. An isolation valve for controlling the flow of said solid materials under the influence of gravity, said valve including:

a valve body having a central cylindrical passageway with a discharge edge defining an outlet opening;

a sealing seat surrounding said valve body, said sealing seat being spaced radially from said passageway;

closure means moveable with respect to said valve body between a closed position wherein the flow of solid material through said valve body is prevented and an open position wherein solid material can flow through said valve body, said closure means having a peripheral sealing surface;

at least part of said sealing seat being downstream of said discharge edge of said central cylindrical passageway when said closure means is in said closed position thereof;

said peripheral sealing surface interacting with said sealing seat in said closed position of said closure means to define a sealing position of said peripheral sealing surface on said sealing seat;

said closure means also including:

a central shut off surface which is directly opposed to said outlet opening and spaced from said discharge edge when said closure means is in said closed position, an annular projecting element located radially outward of said valve body and extending above said discharge edge of said valve body when said closure means is in said closed position;

said projecting element and said peripheral sealing surface cooperating to protect said peripheral sealing surface from abrasion when said closure member is opened to permit flow of said solid material; and operating means for moving said closure member between said closed and open positions thereof.

12. An isolation valve as in claim 11 wherein:
said annular projecting element is generally triangular in cross section.

13. An isolation valve as in claim 11 wherein:
said annular projecting element includes an outer flank surface having a first gradient with respect to the axis of said cylindrical passageway of said valve body; and said peripheral sealing surface is adjacent to said outer flank surface and has a second gradient with respect to the axis of said cylindrical passageway of said valve body;

said second gradient being steeper than said first gradient;

said projecting element, and said first and second gradients cooperating to protect said peripheral sealing surface from abrasion when said closure member is opened to permit flow of solid material.

14. An isolation valve as in claim 11 including:
a peripheral shut off surface surrounding and adjacent to said central shut off surface;

said peripheral shut off surface and said discharge edge of said valve body cooperating to define an air seal when said closure means is in said closed position thereof.

15. An isolation valve as in claim 11 wherein:
said discharge edge of said valve body is chamfered.

16. An isolation valve as in claim 11 wherein:
the outlet opening of said valve body has a circular cross-section and said closure member has the form of a dish with a raised rim.

17. An isolation valve as in claim 16, wherein:

said sealing seat includes an O-ring.

18. An isolation valve as in claim 17, wherein:

said O-ring is in a conical sealing surface of said sealing seat, and said peripheral sealing surface of said closure means has a spherical surface.

19. An isolation valve as in claim 18 wherein:

said closure means is equipped with an articulation defining two perpendicular pivot axes.

20. An isolation valve as in claim 11 wherein:

said closure means is mounted on one end of a pivot arm, and an opposed end of said pivot arm is articulated about an axis located away from the flow of materials.

21. An isolation valve as in claim 11 including:

passage means for blowing in a pressurized gas upstream of said one sealing position to clean said peripheral sealing surface and said sealing seat prior to closure of said closure member.

22. An isolation valve as in claim 11 wherein:

said outer peripheral flank of said projecting element includes an anti-abrasive coating.

23. An isolation valve as in claim 11 wherein:

said peripheral sealing surface of said closure means includes an anti-corrosive coating.

* * * * *